United States Patent [19]

Kobayashi et al.

[11] Patent Number: 5,138,453

[45] Date of Patent: Aug. 11, 1992

[54] GHOST CANCELLING CIRCUIT HAVING FILTER CONTROLLED BY VARIABLE LIMITER

[75] Inventors: Satoshi Kobayashi, Tokyo; Junya Saito, Saitama; Tsutomu Kume, Ibaraki; Takatomo Nagamine, Tokyo, all of Japan

[73] Assignee: Sony Corporation, Tokyo, Japan

[21] Appl. No.: 712,673

[22] Filed: Jun. 10, 1991

[30] Foreign Application Priority Data

Jun. 13, 1990 [JP] Japan .................. 2-154714

[51] Int. Cl.⁵ .................. H04N 5/213; H04N 5/210
[52] U.S. Cl. .................. 358/167; 358/905
[58] Field of Search .................. 358/167, 905, 36

[56] References Cited

U.S. PATENT DOCUMENTS

| | | | |
|---|---|---|---|
| 4,413,282 | 11/1983 | Wargo | 358/167 |
| 4,458,269 | 7/1984 | Schroeder | 358/167 |
| 4,476,491 | 10/1984 | Murata | 358/905 |
| 4,667,241 | 5/1987 | Saito | 358/905 |
| 5,053,870 | 10/1991 | Ito | 358/905 |

Primary Examiner—James J. Groody
Assistant Examiner—Sherrie Hsia
Attorney, Agent, or Firm—Lewis H. Eslinger; Jay H. Maioli

[57] ABSTRACT

A circuit for detecting a wave distortion in a circuit for eliminating a ghost wave component, wherein a received video signal is applied to a transversal filter, a reference signal for cancelling a ghost signal (GCR signal) is taken out from an output signal from the transversal filter, a ghost wave component is picked up from the GCR signal, a signal for controlling a transmission characteristic of the transversal filter is formed on the basis of the picked-up ghost wave component, and the control signal is applied to the transversal filter to thereby extract from the filter a video signal from which the ghost wave component is cancelled. This circuit includes a variable limiter provided on a signal line for transmitting the control signal to the transversal filter and an unit for controlling a limiter level of the variable limiter to be decreased with time.

5 Claims, 7 Drawing Sheets

FIG. 2A (PRIOR ART)

| Field Number | 1 | 2 | 3 | 4 | 5 | 6 | 7 | 8 |
|---|---|---|---|---|---|---|---|---|
| Line to be Inserted | 18 | 281 | 18 | 281 | 18 | 281 | 18 | 281 |
| Signal | GCR | O (PDS) | GCR | O (PDS) | O (PDS) | GCR | O (PDS) | GCR |
| (Signal) | S1 | S2 | S3 | S4 | S5 | S6 | S7 | S8 |

FIG. 2B (PRIOR ART)

$$S = \frac{1}{4}\{-(S_5-S_1)+(S_6-S_2)-(S_7-S_3)+(S_8-S_4)\}$$
$$= GCR$$

FIG. 2C (PRIOR ART)

$$S = \frac{1}{4}\{-(S_5-S_1)+(S_6-S_2)-(S_7-S_3)+(S_8-S_4)\}$$
$$= \frac{1}{4}(S_1-S_2-S_3-S_4-S_5+S_6-S_7+S_8)$$

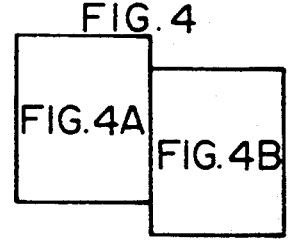
*FIG. 4A*
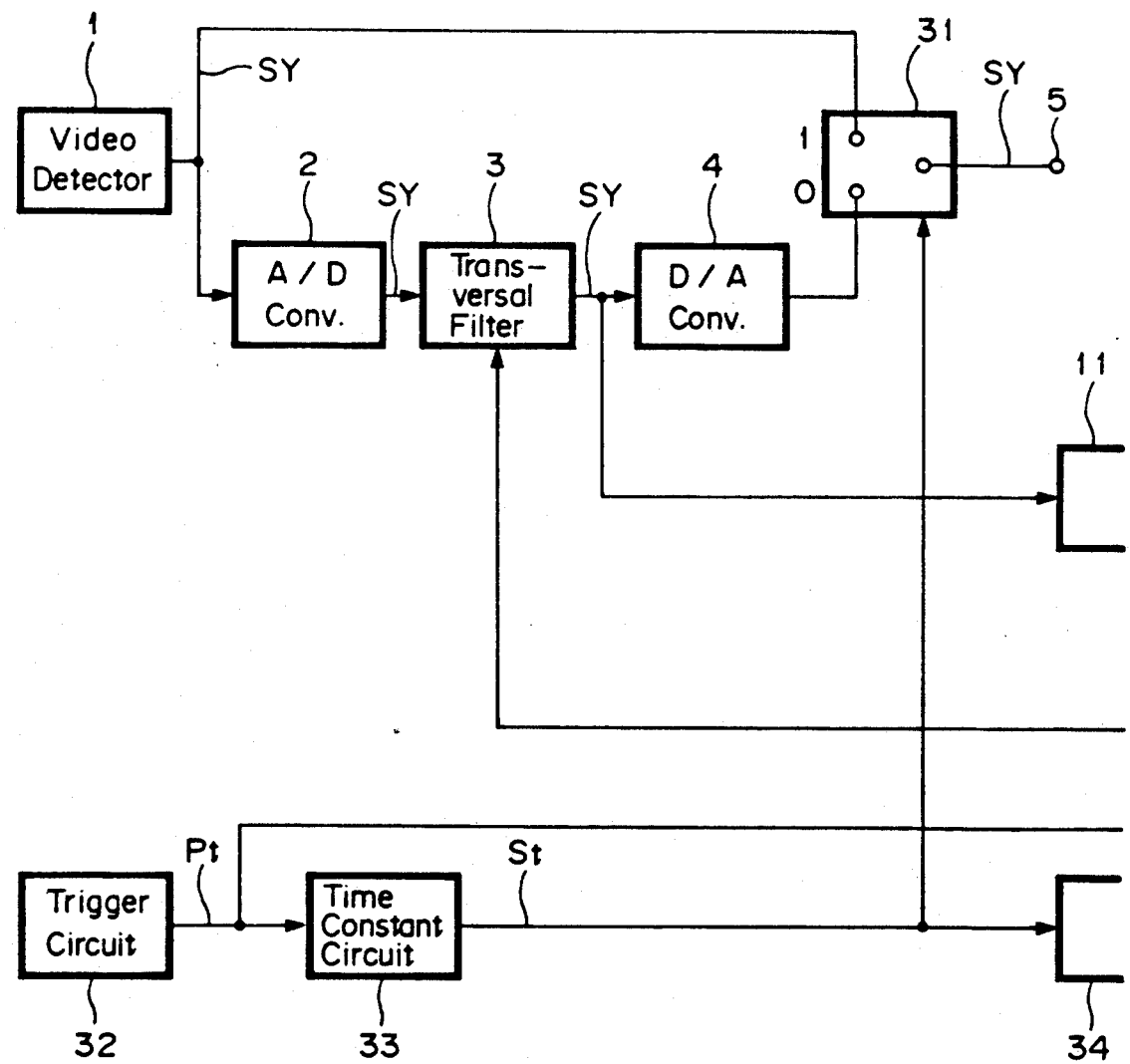

FIG. 5A Pt
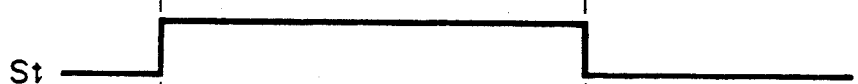
FIG. 5B St
FIG. 5C Sc
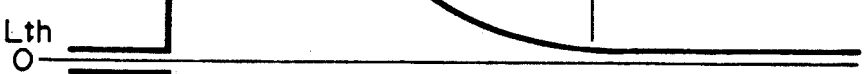
FIG. 5D Lth

GHOST CANCELLING CIRCUIT HAVING FILTER CONTROLLED BY VARIABLE LIMITER

BACKGROUND OF THE INVENTION

1. Field of the Invention

The present invention generally relates to ghost cancelling circuits and, more particularly, is directed to a circuit for detecting waveform distortion of a video signal used in a ghost eliminating or cancelling circuit.

2. Description of the Prior Art

In the television receivers, cancellation or removal of a ghost wave component of a received video signal can be performed in the following manner.

That is, a reference signal for ghost cancellation (hereinafter referred to simply as a GCR signal) is added to the video signal in a transmitter side.

In a receiver side, a waveform of the GCR signal (including a ghost wave component) of the received video signal is compared with a waveform of a GCR signal formed in the receiver side to extract the ghost wave component and to control the transmission characteristic of a transversal filter, for example, so as to eliminate the extracted ghost wave component.

As the GCR signal, such a signal SGCR shown in FIG. 1A has been used.

In FIG. 1A, a symbol HD represents a horizontal synchronizing pulse and BRST a burst signal. As shown in FIG. 1A, a first GCR signal is formed to have a bar pattern waveform which is disposed succeeding to a horizontal period and has a width of 44.7 $\mu$ sec. and a level of 70 IRE. The rising characteristics of the bar pattern waveform is a ringing characteristics of sin X/X.

Further, a second GCR signal PDS is formed to have a pedestal waveform whose flat-topped level is 0 as shown in FIG. 1B.

As shown in FIG. 2A, the GCR signal is constituted with a repetition period of 8 fields of the video signal in a manner that the first GCR signal GCR is inserted in a 18'th or a 281'th line of each of the 1st, 3rd, 6th and 8th fields while the second GCR signal PDS is inserted in a 18'th or a 281'th line of each of the remaining 2nd, 4th, 5th and 7th fields and the thus constructed GCR signal SGCR is inserted in the video signal and transmitted.

Supposing that the first to eighth GCR signals SGCR are called signals S1-S8, respectively, if these signals S1 to S8 are operated in the receiver side based on the equation of FIG. 2B, the result of the operation will be a signal GCR. If the ghost wave component is included in the received GCR signal, the result of the operation also includes a ghost wave component Sg of the signal GCR.

Thus, it is possible to eliminate the ghost component on the basis of the signal GCR (and the component Sg) of the operation result.

In this case, each of the burst signal BRST, chrominance signals and the horizontal synchronizing pulses HD exhibits the same phase every eight fields, so that each of the burst signal BRST, chrominance signal and horizontal synchronizing pulse HD is cancelled when performing the operations of the signals S1-S8.

Thus, the signal GCR (and the ghost wave component Sg) obtained through the operation does not include any of the burst signal BRST, chrominance signal and the horizontal synchronizing pulse HD, so that the elimination or cancellation of a so-called front ghost and rear ghost and waveform equalization can be performed within a range of 45 $\mu$ sec. at maximum. Further, an erroneous detection can be prevented for a long ghost having a width of about 80 $\mu$ sec.

FIG. 3 is a block diagram showing an example of the conventional ghost cancelling circuit using the GCR signal SGCR In FIG. 3, a composite color video signal SY added with the above-described GCR signal SGCR is picked up from a video signal detecting circuit 1 and applied to an analog-to-digital (A/D) converter 2 to be converted into a digital video signal SY of 8 bits for one sample, for example. The digital video signal SY is then applied to a digital-to-analog (D/A) converter 4 through a transversal filter 3 with 640 steps or taps, for example, to be converted into an original analog video signal SY and then taken out from a terminal 5.

In that time, in a detecting circuit 10, a ghost wave component is detected from the GCR signal SGCR to control the transmission characteristic of the transversal filter 3 on the basis of the detected output to thereby eliminate the ghost wave component from the video signal.

The operation shown in FIG. 2B can be rewritten into the equation of FIG. 2C which means that the operation can be performed by sequentially accumulating the GCR signals SGCR in the respective fields.

Thus, in the detecting circuit 10, the digitized video signal SY from the filter 3 is applied to a gate circuit 11 to extract the GCR signal SGCR (including foregoing and succeeding detection periods), and then the extracted signal SGCR is applied to a buffer memory 12 to hold at every one field period, all of the GCR signals SGCR during the period.

The GCR signals SGCR stored in the memory 12 are applied to an operation circuit 21. This operation circuit 21 and the following circuits 22 to 25 are constituted by a microcomputer 20 and software in practice but in this figure they are represented by hardware.

In the operation circuit 21, the GCR signals SGCR stored in the memory 12 are sequentially read out and added or subtracted according to the equation of FIG. 2C at every one field period to thereby obtain the signal GCR and the ghost wave component Sg as the result of the operation of the eight fields. The signal GCR and the component Sg thus obtained are applied to the subtracting circuit 22, to which a reference GCR signal 23 with a reference waveform of the signal GCR shown in FIG. 1A generated by a reference GCR signal forming circuit 23 is also applied.

The subtracting circuit 22 performs the subtraction operation between these signals to thereby deliver the ghost wave component Sg of the received signal GCR. Now, this ghost wave component Sg also represents an error component resulting from the fact that the ghost wave component can not be cancelled completely from the received video signal.

The transversal filter has a pulse response characteristic but the signal GCR has a bar pattern waveform, and so the ghost wave component Sg delivered from the subtracting circuit 22 is applied to the differentiating circuit 24 to be converted into a differentiated pulse Pg which is in turn applied to the converting circuit 25.

The pulse Pg is converted in the converting circuit 25 into a signal ST representing a correction or modification value of a tap coefficient or a tap gain of the transversal filter 3 and then applied to the filter 3 to thereby control the transmission characteristic thereof to a direction of cancelling and eliminating the ghost wave component Sg of the GCR signal SGCR delivered from the filter 3.

This operation is repeatedly performed to gradually adjust the characteristic of the transversal filter 3 to thereby gradually converge the characteristic thereof to that for eliminating the ghost wave component Sg of the GCR signal SGCR.

When the characteristic of the filter 3 is converged sufficiently, the ghost wave component Sg of the GCR signal SGCR delivered from the filter 3 will be decreased to a negligible small level and also the ghost component of the inherent video signal SY is decreased to a negligible small level by the filter 3.

Accordingly, the video signal SY from which the ghost wave component is cancelled can be taken out from the terminal 5.

The above-described conventional ghost cancelling circuit is described in "Ghost Cancel Reference Signal System", the Journal of National Conference held by the Institute of Television Engineers of Japan, 1989.

In this conventional circuit, the characteristic of the transversal filter 3 is gradually adjusted to thereby converge it to a required characteristic.

In the system having an adaptive function as described above, as an algorithm for improving an evaluation value by repeatedly adjusting the parameter of the system, the hill climbing method is well known. According to the ADA (active division algorithm) methods as one of the hill climbing method, a value Cj(v) of a parameter at a γ'th process is modified according to the following equation.

$$C_j(v+1) = C_j(v) - \alpha \frac{\partial D}{\partial C_j(v)}$$
$$= C_j(v) - \Delta C$$

where D represents the evaluation function, Cj the parameter (j = 1 ~ n), Cj(γ) the value of a parameter at a γ'th process, α the coefficient, and ΔC the value to be modified.

This ADA method can be applied to the setting or adjustment of the tap coefficient of the transversal filter 3 and in this case the value ΔC of the above-described equation will be the correction or modification value of the tap coefficient of the signal ST.

However, if the tap coefficient of the transversal filter 3 is set according to the ADA method, it takes as long a time as about 5 seconds depending on the processing ability of the microcomputer 20 to converge the characteristic of the transversal filter to the required characteristic.

If it requires such a long time as 5 seconds to converge the characteristic, the GCR signal SGCR delivered from the filter may include a noise component if a noise signal is received at the receiver side during a converging period of the characteristic. If a noise signal is included in the GCR signal SGCR, the converging operation in the filter is distorted to thereby delay the convergence thereof.

OBJECTS AND SUMMARY OF THE INVENTION

Accordingly, it is a general object of the present invention to provide an improved circuit for detecting a wave distortion in which the aforementioned shortcomings and disadvantages of the prior art can be substantially eliminated.

More specifically, it is another object of the present invention to provide an improved circuit for detecting a wave distortion which is capable of swiftly and stably converging the characteristic of the transversal filter.

According to an aspect of the present invention, in a circuit for eliminating a ghost wave component, wherein a received video signal is applied to a transversal filter, a reference signal for cancelling a ghost signal (GCR signal) is taken out from an output signal from the transversal filter, a ghost wave component is picked up from the GCR signal, a signal for controlling a transmission characteristic of the transversal filter is formed on the basis of the picked-up ghost wave component, and the control signal is applied to the transversal filter to thereby extract from the filter a video signal from which the ghost wave component is eliminated, a circuit for detecting a wave distortion is comprised of a variable limiter provided on a signal line for transmitting the control signal to said transversal filter and an unit for controlling a limiter level of the variable limiter to be decreased with time.

The above and other objects, features, and advantages of the present invention will become apparent from the following detailed description of illustrative embodiments thereof to be read in conjunction with the accompanying drawings, in which like reference numerals represent the same or similar parts in the several views.

BRIEF DESCRIPTION OF THE DRAWINGS

FIGS. 2A to 2C are diagrams for explaining a method of extracting a signal GCR from a received video signal;

FIGS. 5A to 5D are waveform diagrams, respectively, illustrating waveforms of signals appearing at various portions of the circuit of FIG. 4.

DETAILED DESCRIPTION OF THE PREFERRED EMBODIMENTS

The present invention will now be described with reference to the accompanying drawings.

Figure 1A:
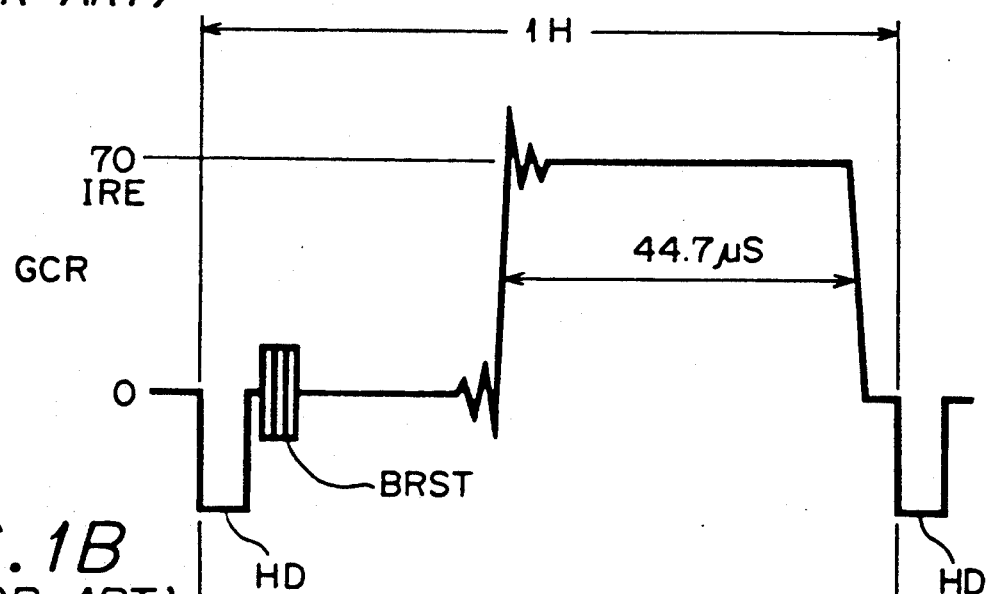
FIGS. 1A and 1B are diagrams illustrating waveforms of GCR signals.
Figure 1B:
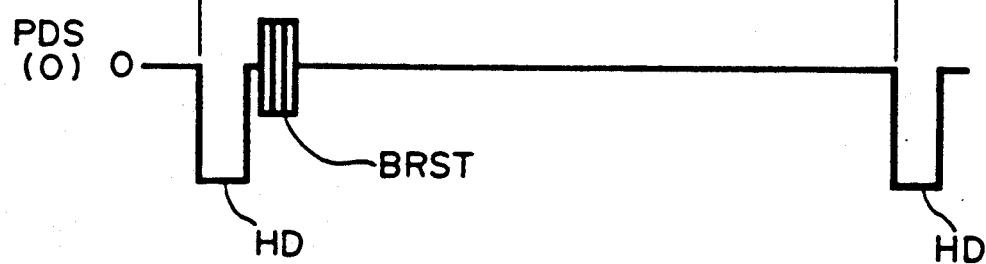
Figure 3:
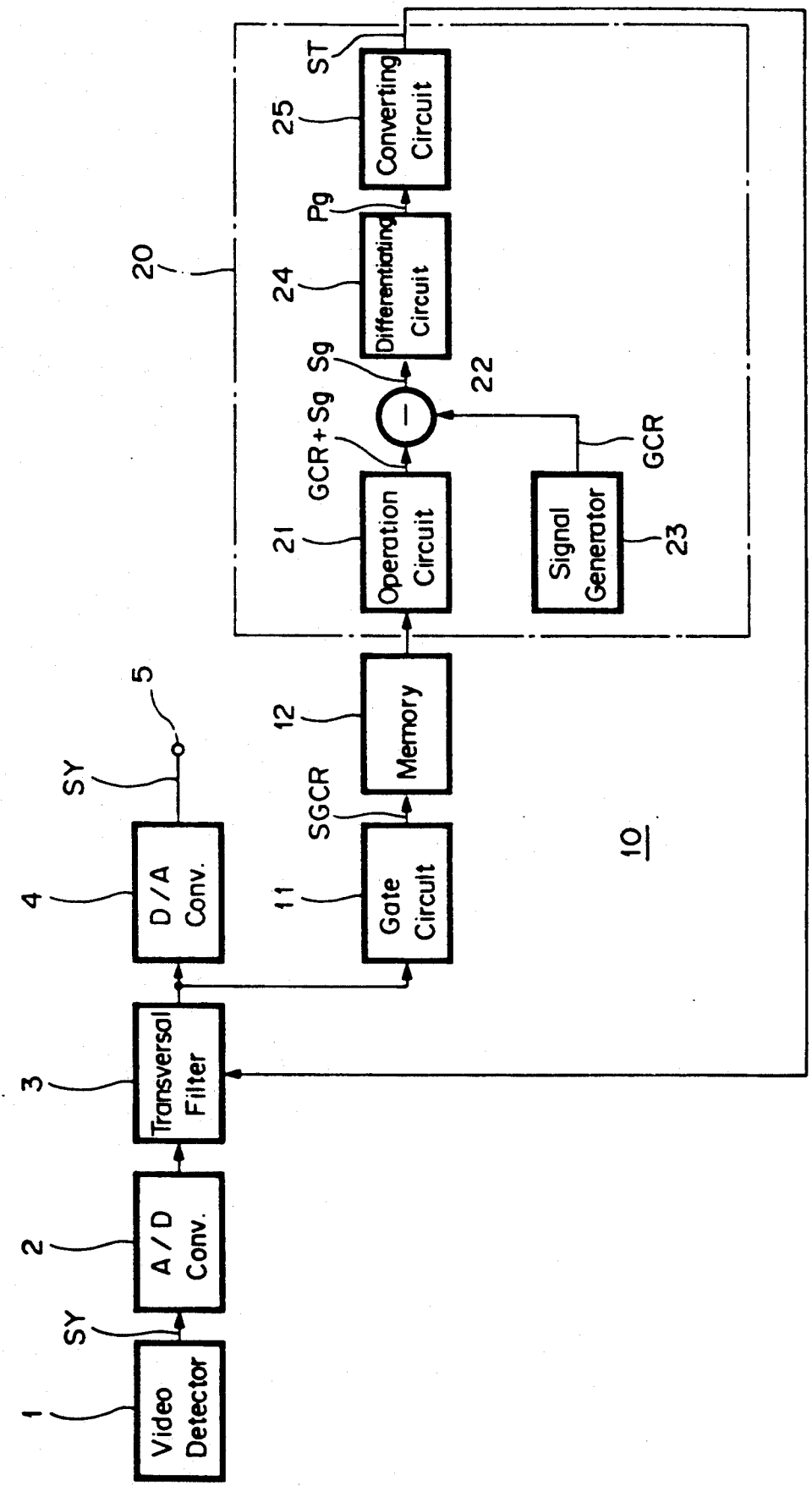
FIG. 3 is a block diagram illustrating an example of a conventional ghost cancelling circuit.
Figure 4B:
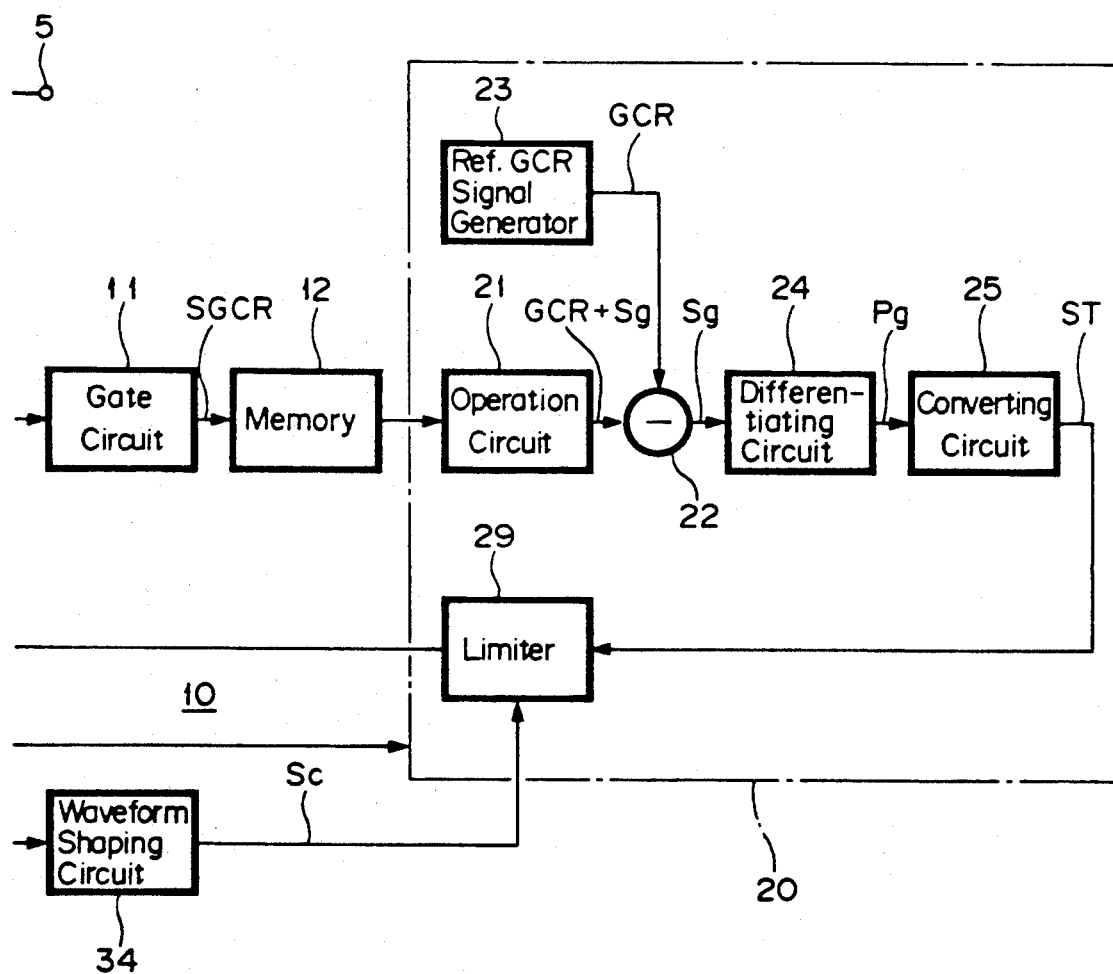
FIG. 4 is a block diagram of FIGS. 4A and 4B, as FIGS. 4A and 4B are block diagrams illustrating an embodiment of a ghost cancelling circuit having a circuit for detecting a wave distortion according to an embodiment of the present invention.

Referring now to FIG. 4 (formed of FIGS. 4A and 4B drawn on two sheets of drawings so as to permit the use of a suitably large scale), which illustrates a ghost cancelling circuit having a circuit for detecting a waveform distortion according to an embodiment of the present invention, like reference numerals as those in FIG. 3 denote like or corresponding elements and so the explanations of functions thereof will be omitted hereinafter merely to simplify the explanation thereof.

In the embodiment of FIG. 4, a variable limiter 29 is provided on a signal line provided between the converting circuit 25 and the transversal filter 3 for transmitting the signal ST representing a correction or modification value of a tap coefficient or a tap gain of the filter 3. The limiter 29 may be realized by any one of software and hardware but in this embodiment it is realized by software in a microcomputer 20.

The video signal SY from the video signal detecting circuit 1 is applied to the analog-to-digital (A/D) converter 2 and also to a switching circuit 31. A video signal from the digital-to-analog (D/A) converter 4 is also applied to the switching circuit 31.

A trigger circuit 32 is provided for delivering a trigger pulse Pt as shown in FIG. 5A at a time point t1 where such operations as a channel switching, turning-on of a power source or an operation of a ghost cancelling key by a user is performed.

The pulse Pt is applied to the microcomputer 20 as a signal for starting the calculation and setting of the tap coefficient of the transversal filter 3. The pulse Pt is also applied to a time constant circuit 33 which in turn generates a control signal St which becomes a high level from the time point t1 for a predetermined period, for example 5 seconds, that is, for a period Tt required for performing a process for eliminating a ghost wave component to a time point t2, as shown in FIG. 5B. This signal St is applied to the switching circuit 31 as a control signal thereof.

The output signal of the switching circuit 31 is taken out from the terminal 5.

The signal St is also applied to a waveform shaping circuit 34 which in turn delivers a signal Sc which maintains a level of 100% for 2 seconds, for example, from the time point t1 but decreases in its level monotonically thereafter, as shown in FIG. 5C. The signal Sc is applied to the variable limiter 29 as a control signal for controlling a limiter level Lth thereof, so that the limiter level Lth is controlled to correspond to the level of the signal Sc, as shown in FIG. 5D.

According to this circuit configuration, in the stationary state (before the time point t1 and after the time point t2, for example), the signal level of the signal St is "0" and so the switching circuit 31 is connected to the D/A converter 4 as shown in FIG. 4. Thus, in the stationary state, the ghost cancelling circuit of FIG. 4 constitutes the circuit configuration equivalent to that of FIG. 3 and so the ghost cancelling operation is performed in the same manner as that of the circuit of FIG. 3.

However, if any one of the operations among the channel switching, turning-on of the power source or the operation of the ghost cancelling key by a user is performed at an arbitrary time point t1, the trigger pulse Pt is delivered from the trigger circuit 34 as shown in FIG. 5A and so the signal level of the signal St becomes "1" during the period Tt in response to the pulse Pt as shown in FIG. 5B.

Further, in response to the pulse Pt delivered at the time point t1, the microcomputer 20 is triggered to start the calculation and setting of the tap coefficient of the transversal filter 3.

In this case, the signal ST representing the tap coefficient from the converting circuit 25 is applied to the filter 3 through the variable limiter 29, while the limiter level Lth of the limiter 29 is decreased gradually by the signal Sc as shown in FIG. 5D.

However, the signal ST representing the tap coefficient is also decreased gradually from the time point t1 as described above, and so the signal ST is passed through the limiter 29 and applied to the filter 3 without being limited in its level even if the limiter level Lth is decreased gradually as shown in FIG. 5D, so that the calculation and setting of the tap coefficient of the filter 3 can be executed normally in the microcomputer 20.

That is, the limiter level Lth of the limiter 29 is changed in correspondence to the level change of the original signal ST so that the signal level of the signal ST can not be limited by the limiter 29 and so the calculation and setting of the tap coefficient of the filter 3 can be executed normally.

At the time point t2, the calculation and setting of the tap coefficient of the filter 3 are basically finished, but, in this example, the limiter level Lth of the limiter 29 does not decrease to 0 completely after the time point t2 and so the calculation and setting of the tap coefficient of the filter 3 is continued in the microcomputer 20, so that the ghost can be eliminated when a slow change of the ghost occurs.

On the other hand, if a noise component is included in the GCR signal SGCR during the period Tt, a noise component is also included in the signal ST. However, the part of the noise component of the signal ST whose level is larger than the level of the signal ST is removed by the limiter 29 and then the signal ST whose noise component is partially removed is applied to the filter 3 to thereby set the characteristic thereof.

Accordingly, even if a noise component is included in the GCR signal SGCR, the influence to the characteristic of the filter 3 by the noise can be minimized, so that the characteristic of the transversal filter 3 can be converged swiftly and stably.

During the period Tt where the setting of the characteristic of the filter 3 is performed, the level of the signal St is "1" and so the switching circuit 31 is connected to the video signal detecting circuit 1 instead of the D/A converter 4 in response to the signal St opposite to that shown in FIG. 3. Thus, the video signal SY from the detecting circuit 1 is directly applied to the terminal 5 through the switching circuit 31, so that even if the level of the video signal SY from the filter 3 is disturbed during the period Tt, an image on a display (not shown) can not be influenced at all.

Thus, according to the present invention, on a signal line for transmitting the signal ST representing the modification value of the tap coefficient, the variable limiter 29 whose limiter level Lth is changed in correspondence to the original level of the signal ST is provided, so that even if a noise component is included in the signal ST, the influence to the characteristic of the filter 3 by the noise can be minimized, thereby making it possible to converge the characteristic of the transversal filter 3 readily and stably.

The additional circuit configuration required for performing this operation is only the limiter 29, and further the cost for providing the limiter 29 is not particularly required since the limiter 29 can be realized by software.

Figure 6:
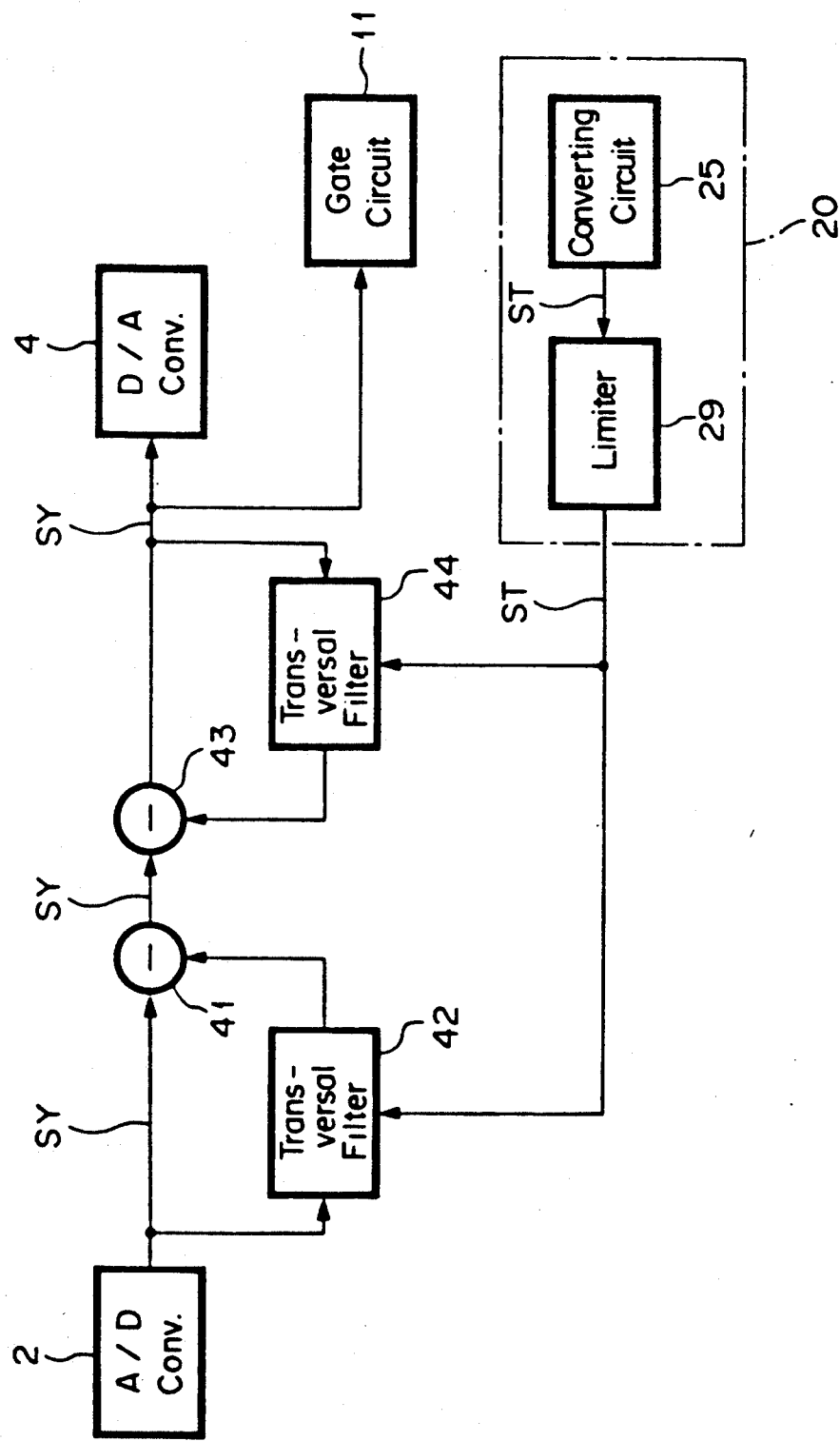
FIG. 6 is a block diagram illustrating a part of the ghost cancelling circuit having another example of the waveform distortion detecting circuit according to the present invention.

FIG. 6 is a block diagram illustrating a main part of another embodiment of the ghost cancelling circuit according to the present invention.

In the embodiment of FIG. 6, a video signal SY from an analog-to-digital (A/D) converter 2 is applied to a first subtracting circuit 41 and also applied thereto through a first transversal filter 42. An output signal from the subtracter 41 is applied to a second subtracter circuit 43, which in turn applies its output signal thereto through a second transversal filter 44 and also to the D/A converter 4.

The signal ST representing a modification value of a tap coefficient of the transversal filter is applied from the variable limiter 29 of the detecting circuit 10 to each of the first and second transversal filters 42 and 44 as a control signal for controlling the transmission characteristic thereof.

In this circuit configuration, the subtracting circuit 41 and the filter 42 constitute a loop of a feedforward type and so the subtracting circuit 41 can deliver a video signal SY from which a near-by ghost wave component including a front ghost is eliminated. On the other hand, the subtracting circuit 43 and the filter 44 constitute a loop of a feedback type and so the subtracting circuit 43 can deliver a video signal SY from which a long ghost wave component is eliminated. Accordingly, it is possible to take out from the terminal 5 a video signal SY from which the near-by ghost component and the long ghost component are eliminated.

As described above, according to the present invention, on the signal line for transmitting the signal ST representing the modification value of the tap coefficient, the variable limiter 29 whose limiter level Lth is changed in correspondence to the original level of the signal ST is provided, so that even if a noise component is included in the signal ST, the influence to the characteristic of the filter 3 (42, 44) by the noise can be minimized, thereby making it possible to converge the characteristic of the transversal filter 3 readily and stably. The additional circuit configuration required for performing this operation is only the limiter 29, and further the cost for providing the limiter 29 is not particularly required since the limiter 29 can be realized by software.

Having described the preferred embodiments of the invention with reference to the accompanying drawings, it is to be understood that the invention is not limited to those precise embodiments and that various changes and modifications could be effected by one skilled in the art without departing from the spirit or scope of the invention as defined in the appended claims.

We claim as our invention:

1. A circuit for cancelling a ghost wave component, wherein a received video signal is applied to a transversal filter, a reference signal for cancelling a ghost signal (GCR signal) is taken out form an output signal form the transversal filter, a ghost wave component is picked up from the GCR signal, a control signal for controlling a transmission characteristic of the transversal filter is formed on the basis of the picked-up ghost wave component, and the control signal is applied to the transversal filter to thereby extract from the transversal filter a video signal from which the ghost wave component is cancelled, comprising:
   a variable limiter provided on the control signal line for limiting a level of the control signal fed to said transversal filter; and
   means for controlling said variable limiter to operate only for a predetermined period of time and to decrease a limiting level of said variable limiter to substantially zero at the conclusion of said predetermined period of time.

2. A circuit for cancelling a ghost wave component according to claim 1, wherein said means for controlling the variable limiter controls the limiting level thereof in response to a predetermined signal in a manner that the limiter level is maintained for a portion of said predetermined period of time at a level of 100% after the reception of the predetermined signal and thereafter to substantially zero as the time lapses.

3. A circuit for cancelling a ghost wave component, wherein a received video signal is applied to a transversal filter, a reference signal for cancelling a ghost signal (GCR signal) is taken out form an output signal from the transversal filter, a ghost wave component is picked up form the GCR signal, a signal for controlling a transmission characteristic of the transversal filter is formed on the basis of the picked-up ghost wave component, and the control signal is applied to the transversal filter to thereby extract from the transversal filter a video signal form which the ghost wave component is cancelled, comprising:
   a variable limiter provided on a signal line for transmitting the control signal to said transversal filter; and
   means for controlling a limiter level of said variable limiter to be decreased with time, wherein said transversal filter includes first and second transversal filter units disposed in loops of a feedforward type and a feedback type, respectively, said first transversal filter unit having an output connected to a first subtractor that also receives the received video signal to form said feedforward loop, and said second transversal filter unit having an input connected to an output of a second subtractor that has an input connected to the output of said first subtractor and an input connected to an output of said second transversal filter unit, thereby forming said feedback loop.

4. A circuit for cancelling a ghost wave component according to claim 2, further comprising a switch receiving an output of said transversal filter and the received video signal and being controlled to output a signal form the circuit by said means for controlling said variable limiter, so that upon receiving said predetermined signal the output signal of the circuit comprises the received video signal and following the lapse of said predetermined period of time the output signal of the circuit comprises an output of said transversal filter.

5. A circuit for cancelling a ghost wave component according to claim 4, further comprising a trigger circuit for producing said predetermined signal upon the occurrence of the operation of a ghost canceller switch or actuation of a main power switch.

* * * * *